United States Patent [19]

Nakane et al.

[11] Patent Number: 5,891,539
[45] Date of Patent: Apr. 6, 1999

[54] COLORANT RESIN COMPOSITION

[75] Inventors: Izumi Nakane; Mitsuaki Nakata; Susumu Miyashita; Masashi Koide, all of Tokyo; Hirokazu Ootaka, deceased, late of Tokyo; Toshiaki Ootaka, heir, Akita, all of Japan

[73] Assignee: Toyo Ink Manufacturing Co., Ltd., Tokyo, Japan

[21] Appl. No.: 692,222

[22] Filed: Aug. 7, 1996

[30] Foreign Application Priority Data

Aug. 10, 1995 [JP] Japan .................................. 7-204159
Aug. 10, 1995 [JP] Japan .................................. 7-204160

[51] Int. Cl.⁶ .................................................. B29D 23/00
[52] U.S. Cl. ........................... 428/36.9; 524/88; 524/104; 524/105; 524/517; 524/522; 524/528
[58] Field of Search ............................ 524/88, 104, 105, 524/517, 522, 528; 428/36.9

[56] References Cited

FOREIGN PATENT DOCUMENTS 0310393  4/1989  European Pat. Off. .

OTHER PUBLICATIONS

Patent Abstracts of Japan, vol. 017, No. 644 (C–1134), Nov. 30, 1993 & JP–A–05 202234 (Toyo Ink Mfg Co Ltd), Aug. 10, 1993 *abstract*.

Database WPI, Section Ch, Week 9336, Derwent Publications Ltd., London, GB; Class A18, AN 93–285508, & JP–A–05 202 234 (Toyo Ink), Aug. 10, 1993 *abstract*.

Patent Abstracts of Japan, vol. 013, No. 255 (C–606), Jun. 13, 1989 & JP–A–01 056747 (Mitsubishi Petrochem Co Ltd), Mar. 3, 1989 *abstract*.

Database WPI, Week 8915, Derwent Publications Ltd., London, GB; AN 89–110677, & JP–A–01 056 747 (Mitsubishi Petrochem), Mar. 3, 1989 *abstract*.

Patent Abstracts of Japan, vol. 015, No. 034 (C–0799), Jan. 28, 1991, & JP–A–02 272044 (Ube Ind Ltd), Nov. 6, 1990, *abstract*.

Database WPI, Section Ch, Week 9050, Derwent Publications Ltd., London, GB; Class A17, AN 90–373594 & JP–A–02 272 044 (Ube Industries), Nov. 6, 1990 *abstract*.

*Primary Examiner*—Mark L. Warzel
*Attorney, Agent, or Firm*—Wenderoth, Lind & Ponack, L.L.P.

[57] ABSTRACT

A molded article or water-supply pipe free from causing dot-like projections or small-diameter blisters on the molded article surface when the molded article is brought into contact with chlorine-containing water is obtained from a resin composition containing a polyolefin resin, a pigment and a copolymer resin obtained from a monomer having an $\alpha,\beta$-unsaturated double bond and a dibasic acid having an unsaturated double bond or an anhydride thereof.

9 Claims, No Drawings

COLORANT RESIN COMPOSITION

FIELD OF THE INVENTION

The present invention relates to a colorant resin composition for producing a colored resin molded article which is to directly contact chlorine-containing water. More specifically, it relates to a colorant resin composition having resistance to chlorine-containing water, which can provide a molded article free from causing dot-like projections or small-diameter blisters on the molded article surface when the molded article is brought into contact with chlorine-containing water.

PRIOR ART OF THE INVENTION

For producing colored molded articles of polyolefin resins such as polyethylene, polypropylene, etc., the polyolefin resins are colored by the use of an inorganic pigment such as zinc oxide, titanium oxide, red iron oxide, ultramarine or cobalt blue, an organic pigment such as an azo, quinacridone, anthraquinone, perylene, isoindolinone, phthalocyanine, dioxazine, indanthrene, perinone or quinophthalone pigment, or a dye such as an azo, anthraquinone, perylene, perinone or thioindigo dye.

When a molded article of a polyolefin resin containing the above pigment or dye is used in a field where the molded article is in direct contact with chlorine-containing water, e.g., as a water-supply pipe, there is a problem that dot-like projections or small-diameter blisters ("blisters" hereinafter) are caused on the molded article surface and peel off partly to be contained in water.

In particular, a water-supply pipe is required to have strict performance against the occurrence of blisters as is provided by JIS K6762 since the water is used for cooking and drinking.

There is therefore proposed a dual-layer pipe of which the inner layer in direct contact with chlorine-containing water contains no pigment and the outer layer contains a pigment. As compared with a mono-layer pipe, however, the above dual-layer pipe is difficult to produce, and requires a special molding machine. Further, it is difficult to produce a dual-layer connector which connects one pipe to another. It is therefore desired to develop a colorant (colored) resin composition which can provide a molded article excellent in resistance to chlorine-containing water.

SUMMARY OF THE INVENTION

It is an object of the present invention to provide a colorant (colored) resin composition having resistance to chlorine-containing water, which can overcome the above problems and provide a molded article excellent in resistance to chlorine-containing water.

According to the present invention, there is provided a colorant (colored) resin composition having resistance to chlorine-containing water, which contains a polyolefin resin, a pigment and a copolymer resin obtained from a monomer having an α,β-unsaturated double bond and a dibasic acid having an unsaturated double bond or an anhydride thereof.

According to the present invention, there is also provided a colorant (colored) resin composition having resistance to chlorine-containing water, which contains 100 parts by weight of a polyolefin resin, 0.01 to 10 parts by weight of a pigment and 0.005 to 10 parts by weight of a copolymer resin obtained from a monomer having an α,β-unsaturated double bond and a dibasic acid having an unsaturated double bond or an anhydride thereof.

According to the present invention, there is also provided a resin composition, specifically a colorant resin composition, having resistance to chlorine-containing water, which contains 100 parts by weight of a polyolefin resin, 0.1 to 100 parts by weight of a pigment and 0.05 to 100 parts by weight of a copolymer resin obtained from a monomer having an α,β-unsaturated double bond and a dibasic acid having an unsaturated double bond or an anhydride thereof.

According to the present invention, further, there is provided a water-supply pipe produced from the above colored resin composition.

DETAILED DESCRIPTION OF THE INVENTION

The polyolefin resin used in the present invention includes polyethylene, polypropylene and polybutene. Of these, polyethylene and polybutene are preferred. The polyethylene includes various kinds of polyethylenes such as high-density (H) polyethylene, a low-density (L) polyethylene and a linear low-density (LL) polyethylene. Generally, a high-density (H) polyethylene is used for producing a water-supply pipe having a large diameter, and a linear low-density polyethylene is used for producing a water-supply pipe having a small diameter.

The pigment used in the present invention includes inorganic pigments such as zinc oxide, titanium oxide, red iron oxide, ultramarine and cobalt blue and organic pigments such as azo, quinacridone, anthraquinone, perylene, isoindolinone, phthalocyanine, dioxazine, indanthrene, perinone and quinophthalone pigments. Generally, water-supply pipes are colored blue, which gives an image of water, for distinguishing them from green-colored gas-supply pipes or others. For this reason, blue pigments such as ultramarine, cobalt blue, a phthalocyanine pigment and an indanthrene pigment are used, and a phthalocyanine blue pigment and an indanthrene blue pigment in particular are preferred.

The phthalocyanine blue pigment used in the present invention has the following formula, and the molecule thereof contains an average of 0 to 8 chlorine atoms. Further, M in the formula (1) is a hydrogen atom or any one of Cu, Zn, Ni and Fe, while M is generally preferably Cu in view of hue and price.

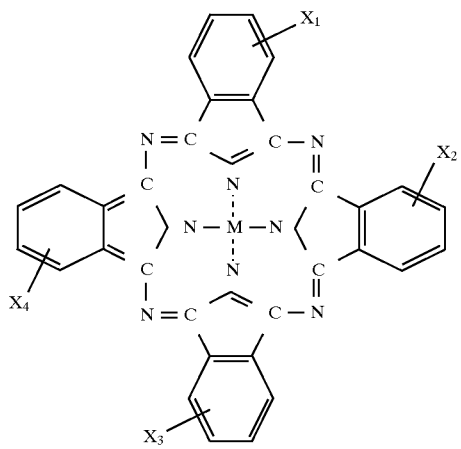

wherein M is a hydrogen atom or any one of Cu, Zn, Ni and Fe, and each of $X_1$ to $X_4$ is a chlorine atom, provided that the total number of $X_1+X_2+X_3+X_4$ is 0 to 8.

In the above formula (1), M is preferably Cu in view of tinting strength, and the total number of $X_1+X_2+X_3+X_4$ is preferably 2 to 4 in view of heat resistance and hue.

The indanthrene blue pigment used in the present invention has the following formula (2).

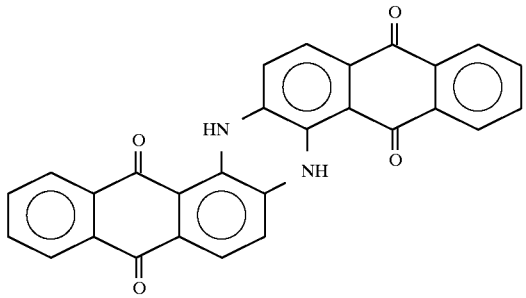

A dye may be used for the improvement of clearness and sharpness, but the dye is required to be insoluble in water.

The resin composition having resistance to chlorine-containing water, provided by the present invention, contains a copolymer resin ("copolymer resin" hereinafter) obtained from a monomer having an α,β-unsaturated double bond and a dibasic acid having an unsaturated double bond or an anhydride thereof. The copolymer resin has high affinity to a pigment and thoroughly wets the pigment surface. It is assumed that the copolymer resin therefore adequately coats the pigment surface and prevents chlorine-containing water from contacting the pigment in a molded article when chlorine-containing water is brought into direct contact with the molded article so that the occurrence of blisters and peelings can be inhibited or prevented.

The above copolymer resin preferably has a weight average molecular weight of 5,000 to 50,000, more preferably 10,000 to 30,000. When the weight average molecular weight of the copolymer exceeds the above upper limit, there may be a problem in preparing a so-called master batch containing a high concentration of a pigment, to be described later. When the above weight average molecular weight is less than the above lower limit, a molded article as an end product may be affected in some cases.

The copolymer resin preferably has an acid value of 50 to 800, more preferably 100 to 500. When the acid value of the copolymer resin is less than the above lower limit, the copolymer resin shows no sufficient affinity to a pigment and does not adequately coat the pigment surface, and it is therefore difficult to prevent the blisters. When the above acid value exceeds the above upper limit, the copolymer resin is liable to absorb moisture and shows high adhesion to a metal, and the extrusion processability of the resin composition is liable to be affected.

The copolymer resin preferably has a melt viscosity of 1,000 to 20,000 poise, more preferably 2,000 to 9,000 poise. These melt viscosity values refer to values obtained by measurement at 160° C. with a flow tester. When the melt viscosity is less than the above lower limit, it is difficult to disperse the pigment. When the melt viscosity exceeds the above upper limit, coating of pigment surface with the copolymer resin tends to be difficult, and the above melt viscosity is therefore preferably in the range of from 1,000 to 20,000.

The above copolymer resin can be obtained, for example, by the method disclosed in JP-A-5-202234.

For example, the monomer having an α,β-unsaturated double bond is not specially limited, and it is selected from an α-olefin, a diolefin, an allyl monomer, an N-vinyl monomer, vinyl ether, vinyl sulfide, a (meth)acrylic acid ester monomer and other copolymerizable vinyl monomer or vinylidene monomer. These monomers may be used alone or in combination. Of these, an α-olefin is particularly preferred.

Specific examples of the α-olefin include ethylene, propylene, butylene, isobutylene, pentene, 1-hexene, 1-heptene, 1-octene, 1-nonene, 1-decene, 1-dodecene, 1-tetradecene, 1-hexadecene, 1-octadecene, 1-eicosene, 1-docosene, 1-tetracosene, 1-hexacosene, 1-octacosene, 1-triacontene, 1-dotriacontene, 1-tetratriacontene, 1-hexatriacontene, 1-octatriacontene, 1-tetracontene and a mixture of at least two of these. The α-olefin is also selected from commercially available products in the trade name of Dialene 128 (C12~18), Dialene 208 (C20~28) and Dialene 39 (at least C30) (supplied by Mitsubishi Chemical Co., Ltd.), and VYBAR 2600 (molecular weight 2,600) and VYBAR 2800 (molecular weight 2,800) (supplied by Toyo Petrolite). From the viewpoint of inhibiting and preventing a molded article from causing blisters and peeling thereof, an α-olefin having 10 to 20 carbon atoms is preferred, and an α-olefin having 12 to 14 carbon atoms is particularly preferred.

With an increase in the number of carbon atoms of the α-olefin, the melt viscosity of the copolymer resin obtained from the α-olefin decreases. If viewed on the basis of the melt viscosity, the wettability to a pigment increases, and the coating effect of the copolymer resin on a pigment improves.

However, with an increase in the number of carbon atoms of α-olefin, the acid value of a copolymer resin obtained from the α-olefin decreases, the affinity between the copolymer resin and a pigment decreases, and the wettability of the copolymer resin to a pigment decreases. As a result, the coating of a pigment with the copolymer resin is insufficient, and there tends to be little effect on the inhibition or prevention of the occurrence of blisters and peelings.

On the other hand, with a decrease in the number of carbon atoms of the α-olefin, the acid value of a copolymer resin obtained from the α-olefin increases, the affinity between the copolymer resin and a pigment increases, and the wettability of the copolymer resin to a pigment increases. It is accordingly expected that the occurrence of blisters and peelings on a molded article will be inhibited or prevented on the basis of the coating of a pigment with the copolymer resin. With a decrease in the number of carbon atoms of the α-olefin, however, the melt viscosity of the copolymer resin increases, and if viewed on the basis of the melt viscosity, the wettability to a pigment decreases, and the coating effect of the copolymer resin on a pigment decreases.

When the wettability of the copolymer resin to a pigment, i.e., coating of a pigment with the copolymer resin, is studied while taking into consideration both of the acid value and the melt viscosity of the copolymer resin, it is preferred to use an α-olefin having 10 to 20 carbon atoms, or it is particularly preferred to use an α-olefin having 12 to 14 carbon atoms, for obtaining the copolymer resin.

Concerning the monomer having an α,β-unsaturated double bond other than the α-olefin, the diolefin includes butadiene, isoprene, neoprene, chloroprene and a mixture of at least two of these.

The allyl monomer includes ally acetate, isopropenyl acetate, ally chloride, isopropenyl chloride, trans-propenyl chloride, cis-propenyl chloride and a mixture of at least two of these.

The N-vinyl monomer includes N-vinylcarbazole, N-vinyl-2-pyrrolidone, N-vonylphthalimide and a mixture of at least two of these.

The vinyl ether includes linear or branched aliphatic alkyl vinyl ethers such as ethyl vinyl ether, propyl vinyl ether, isobutyl vinyl ether and hexyl vinyl ether, p-dioxene and a mixture of at least two of these.

The vinyl sulfide includes ethyl vinyl sulfide, phenyl vinyl sulfide and a mixture of these.

The (meth)acrylic acid ester monomer includes acrylic acid esters of linear or branched aliphatic alcohols such as methyl arylate, ethyl acrylate, butyl acrylate, hexyl acrylate, octyl acrylate, 2-ethylhexyl acrylate, decyl acrylate and dodecyl acrylate, methacrylic acid esters corresponding these acrylic acid esters, and a mixture of at least two of these.

The other copolymerizable vinyl monomer or vinylidene monomer includes vinyl ester, vinylpyridine, vinyl acetate, vinyl propionate, styrene, α-methylstyrene, β-methylstyrene, acrylonitrile, methacrylonitrile, vinylidene chloride and a mixture of at least two of these.

The dibasic acid having an unsaturated double bond or the anhydride thereof includes maleic acid, fumaric acid, itaconic acid, crotonic acid, citraconic acid, maleic anhydride, itaconic anhydride and citraconic anhydride. These dibasic acids may be used alone or in combination. Maleic anhydride is industrially advantageous.

The copolymer resin from a monomer having an α,β-unsaturated double bond and a dibasic acid having an unsaturated double bond or an anhydride thereof can be produced by any one of a solution polymerization method, a bulk polymerization method, an emulsion polymerization method, a suspension polymerization method and a dispersion polymerization method, but the production method shall not be limited to these. The polymerization initiator used in the above production includes peroxides such as benzoyl peroxide, lauryl peroxide, cumene peroxide, diisopropyl peroxycarbonate, di-tert-butyl peroxide and tert-butylperoxybenzoate, and azo compounds such as azobisisobutyronitrile and azobis-2,4-dimethylvaleronitrile.

The resin composition having resistance to chlorine-containing water, provided by the present invention, may be in the form of pellets (to be sometimes referred to as "colored pellets" hereinafter) which are directly used for molding, or may be in the form of pellets (to be sometimes referred to as "master batch" hereinafter) which contain a high concentration of a pigment and are called "master batch". The master batch is diluted with a polyolefin resin, and the resultant mixture is molded to give a molded article.

In the colorant (colored) resin composition having resistance to chlorine-containing water, provided by the present invention, pellets which are directly used for molding (i.e., "colored pellets") preferably contain 100 parts by weight of the polyolefin resin, 0.01 to 10 parts by weight of the pigment and 0.005 to 10 parts by weight of the copolymer resin obtained from the monomer having an α,β-unsaturated double bond and the dibasic acid having an unsaturated double bond or an anhydride thereof.

When the pigment amount is less than 0.01 part by weight, only a very light-colored state is obtained. When the pigment amount exceeds 10 parts by weight, the pigment is liable to impair the mechanical properties of a molded article. When the amount of the copolymer resin is less than 0.005 part by weight, there is almost no effect on the resistance to chlorine-containing water. When the copolymer resin amount exceeds 10 parts by weight, the copolymer resin is liable to impair the mechanical properties of a molded article due to the poor compatibility with the polyolefin resin.

Further, for fully coating the pigment surface with the above copolymer resin, the amount of the copolymer resin is preferably at least ½ of the weight of the pigment.

When the resin composition of the present invention is prepared as a master batch, the resin composition preferably contains 100 parts by weight of the polyolefin resin, 0.1 to 100 parts by weight of the pigment and 0.05 to 100 parts by weight of the copolymer resin obtained from the monomer having an α,β-unsaturated double bond and the dibasic acid having an unsaturated double bond or an anhydride thereof.

When the pigment amount is less than 0.1 part by weight, it is difficult to obtain a molded article having a desired colored state. When the pigment amount exceeds 100 parts by weight, the dispersion of the pigment in the master batch is insufficient. When the copolymer resin amount is less than 0.05 part by weight, there is almost no effect on the resistance to chlorine-containing water. When the copolymer resin amount exceeds 100 parts by weight, the granulation of the master batch is difficult.

Further, for fully coating the pigment surface with the above copolymer resin, the amount of the copolymer resin is preferably at least ½ of the weight of the pigment.

The master batch is diluted with a polyolefin resin and the mixture is molded to obtain a molded article. The polyolefin resin used for the above dilution is that which is the same as, or similar to, the polyolefin resin used for preparing the master batch.

Like the pellets which are molded directly without being diluted, the above mixture (diluted master batch) for producing a molded article as an end product preferably contains 100 parts by weight of the polyolefin resin, 0.01 to 10 parts by weight of the pigment and 0.005 to 10 parts by weight of the copolymer resin obtained from the monomer having an α,β-unsaturated double bond and the dibasic acid having an unsaturated double bond or an anhydride thereof.

When the master batch and the colored pellets are compared, the production steps thereof have almost no difference, and the master batch is a little more expensive since the master batch contains a higher concentration of the pigment. However, the master batch can be diluted with 0.5 to 200 parts by weight, based on the master batch, of an inexpensive polyolefin resin for obtaining a molded article. When molded articles as end products are compared, it is preferred to produce a molded article from the master batch diluted with a polyolefin resin, since the molded article produced from the master batch diluted with a polyolefin resin is less expensive.

The colorant (colored) resin composition having resistance to chlorine-containing water, provided by the present invention, can be molded into articles having the form of a film, a sheet, a plate, a container, a pipe or a fiber. Further, the colorant (colored) resin composition of the present invention has excellent resistance to chlorine-containing water and can be therefore preferably used for producing a water-supply pipe. The term "pipe" used in the present invention includes a pipe itself and a part (connector) used for connecting pipes.

The colorant (colored) resin composition of the present invention may contain a metal soap, a dispersing agent such as a polyethylene having an intermediate or low molecular weight, an antioxidant and an ultraviolet light absorbent as required in such amounts that will not impair the effect of the present invention.

EXAMPLES

The present invention will be explained further in detail with reference to Examples hereinafter. First, the method of producing the copolymer resin from the monomer having an α,β-unsaturated double bond and the dibasic acid having an unsaturated double bond or the anhydride thereof will be explained below. In Examples hereinafter, "%" stands for "% by weight", and "part" stands for "part by weight".

Preparation Example 1

A flask was charged with 650 g of an α-olefin having 12 to 14 carbon atoms, 4.4 g of di-tert-butyl peroxide and 14 g of toluene, and the atmosphere in the flask was replaced with nitrogen. While the mixture was stirred under heat at 150° C., maleic anhydride was added at intervals of 2 minutes by 11.7 g each up to the total amount of 350 g, and di-tert-butyl peroxide was added at intervals of 20 minutes by 1.1 g each up to the total amount of 4.4 g. After the addition, 1 g of di-tert-butyl peroxide was further added, and the mixture was maintained at 160° C. to allow the mixture to react further for 6 hours. After the completion of the reaction, the content which was hot was withdrawn and cooled to solidness to give a copolymer resin having a weight average molecular weight of 17,000, an acid value of 400 and a melt viscosity of 3,000 poise (measured at 160° C. with a flow tester).

Preparation Example 2

A flask was charged with 50 g of an α-olefin having 10 carbon atoms, 930 g of an α-olefin having a number average molecular weight of 2,600, 0.44 g of di-tert-butyl peroxide and 1.4 g of toluene, and the atmosphere in the flask was replaced with nitrogen. While the mixture was stirred under heat at 150° C., maleic anhydride was added at intervals of 2 minutes by 1.17 g each up to the total amount of 35 g, and di-tert-butyl peroxide was added at intervals of 20 minutes by 0.11 g each up to the total amount of 0.44 g. After the addition, 0.1 g of di-tert-butyl peroxide was further added, and the mixture was maintained at 160° C. to allow the mixture to react further for 6 hours. After the completion of the reaction, the content which was hot was withdrawn and cooled to solidness to give a copolymer resin having a weight average molecular weight of 18,000, an acid value of 100 and a melt viscosity of 4,000 poise (measured at 160° C. with a flow tester).

Preparation Example 3

A flask was charged with 595 g of an α-olefin having 10 carbon atoms, 4.0 g of di-tert-butyl peroxide and 14 g of toluene, and the atmosphere in the flask was replaced with nitrogen. While the mixture was stirred under heat at 150° C., maleic anhydride was added at intervals of 2 minutes by 13.5 g each up to the total amount of 405 g, and di-tert-butyl peroxide was added at intervals of 20 minutes by 1.0 g each up to the total amount of 4.0 g. After the addition, 1.0 g of di-tert-butyl peroxide was further added, and the mixture was maintained at 160° C. to allow the mixture to react further for 6 hours. After the completion of the reaction, the content which was hot was withdrawn and cooled to solidness to give a copolymer resin having a weight average molecular weight of 22,000, an acid value of 460 and a melt viscosity of 18,000 poise (measured at 160° C. with a flow tester).

Preparation Example 4

A flask was charged with 1,276 g of an α-olefin having 20 to 28 carbon atoms, 3.6 g of di-tert-butyl peroxide and 14 g of toluene, and the atmosphere in the flask was replaced with nitrogen. While the mixture was stirred under heat at 150° C., maleic anhydride was added at intervals of 2 minutes by 13.7 g each up to the total amount of 412 g, and di-tert-butyl peroxide was added at intervals of 20 minutes by 0.9 g each up to the total amount of 1.8 g. After the addition, 1 g of di-tert-butyl peroxide was further added, and the mixture was maintained at 160° C. to allow the mixture to react further for 6 hours. After the completion of the reaction, the content which was hot was withdrawn and cooled to solidness to give a copolymer resin having a weight average molecular weight of 5,500, an acid value of 270 and a melt viscosity of 1,500 poise (measured at 160° C. with a flow tester).

Example 1

50 Parts of the resin obtained in Preparation Example 1 and 50 parts of phthalocyanine blue (Pigment Blue 15:3) were kneaded with a kneader to obtain a master batch intermediate. Then, 100 parts of a high-density polyethylene (MFR=0.062 g/10 min (190° C., 2.16 kgf), density 0.952 g/cm$^2$) and 3.2 g of the above master batch intermediate were mixed with a Henschel mixer, and the mixture was extruded with a single-screw extruder at 220° C. to form strands. The strands were cooled and pelletized to obtain a master match. Then, 100 parts of a high-density polyethylene and 5 parts of the master batch were mixed, and the mixture was injection molded with an injection molding machine to prepare a test plate. The test plate was subjected to a test on resistance to chlorine-containing water under the following conditions according to JIS K6762, to find a state of occurrence of blisters. Table 1 shows the result.

Testing conditions

Chlorine concentration: 2,000±100 ppm

Temperature: 60° C.

Immersion time: 168 hours

Evaluation ratings

1=At least 10 dot-like projections or small-diameter blisters having a diameter of at least 0.4 mm were found in an area of 1 cm$^2$ on the plate surface.

2=Four to nine dot-like projections or small-diameter blisters having a diameter of at least 0.4 mm were found in an area of 1 cm$^2$ on the plate surface.

3=Three or two dot-like projections or small-diameter blisters having a diameter of at least 0.4 mm were found in an area of 1 cm$^2$ on the plate surface.

4=One or no four dot-like projections or small-diameter blisters having a diameter of at least 0.4 mm was found in an area of 1 cm$^2$ on the plate surface.

Example 2

A master batch was obtained in the same manner as in Example 1 except that 50 parts of the resin obtained in Preparation Example 1 was replaced with 25 parts of a polyethylene having a low molecular weight and 25 parts of the resin obtained in Preparation Example 1. The master batch was used for preparing a test plate in the same manner as in Example 1, and the test plate was tested for resistance to chlorine-containing water in the same manner as in Example 1 to see a state of occurrence of blisters. Table 1 shows the result.

Example 3

A master batch was obtained in the same manner as in Example 2 except that the amount of the master batch intermediate was changed from 3.2 parts to 1.6 parts. The master batch was used for preparing a test plate in the same manner as in Example 1, and the test plate was tested for resistance to chlorine-containing water in the same manner as in Example 1 to see a state of occurrence of blisters. Table 1 shows the result.

Example 4

A master batch was obtained in the same manner as in Example 2 except that the amount of the master batch intermediate was changed from 3.2 parts to 0.5 part. The master batch was used for preparing a test plate in the same manner as in Example 1, and the test plate was tested for resistance to chlorine-containing water in the same manner as in Example 1 to see a state of occurrence of blisters. Table 1 shows the result.

Example 5

A master batch was obtained in the same manner as in Example 2 except that the amount of the master batch intermediate was changed from 3.2parts to 10 parts. The master batch was used for preparing a test plate in the same manner as in Example 1, and the test plate was tested for resistance to chlorine-containing water in the same manner as in Example 1 to see a state of occurrence of blisters. Table 1 shows the result.

Example 6

A master batch was obtained in the same manner as in Example 1 except that 50 parts of the resin obtained in Preparation Example 1 was replaced with 50 parts of the resin obtained in Preparation Example 2. The master batch was used for preparing a test plate in the same manner as in Example 1, and the test plate was tested for resistance to chlorine-containing water in the same manner as in Example 1 to see a state of occurrence of blisters. Table 1 shows the result.

Example 7

A master batch was obtained in the same manner as in Example 1 except that the amount of the master batch intermediate was changed from 3.2 parts to 20 parts. 10 Parts of the master batch was used for preparing a test plate in the same manner as in Example 1, and the test plate was tested for resistance to chlorine-containing water in the same manner as in Example 1 to see a state of occurrence of blisters. Table 1 shows the result.

Example 8

A master batch was obtained in the same manner as in Example 2 except that the amount of the master batch intermediate was changed from 3.2 parts to 0.8 part. The master batch was used for preparing a test plate in the same manner as in Example 1, and the test plate was tested for resistance to chlorine-containing water in the same manner as in Example 1 to see a state of occurrence of blisters. Table 1 shows the result.

Example 9

A master batch was obtained in the same manner as in Example 1 except that the phthalocyanine blue was replaced with indanthrene blue (Pigment Blue 60). The master batch was used for preparing a test plate in the same manner as in Example 1, and the test plate was tested for resistance to chlorine-containing water in the same manner as in Example 1 to see a state of occurrence of blisters. Table 1 shows the result.

Example 10

100 Parts of a high-density polyethylene (MFR=0.062 g/10 min (190° C., 2.16 kgf), density 0.952 g/cm$^2$), 1.6 parts of the resin obtained in Preparation Example 1 and 1.6 parts of phthalocyanine blue (Pigment Blue 15:3) were mixed, and the mixture was kneaded and granulated with a single-screw extruder at 220° C. to obtain colored pellets. Then, the colored pellets were fed to an injection molding machine to obtain a test plate, and the test plate was tested for resistance to chlorine-containing water in the same manner as in Example 1 to see a state of occurrence of blisters. Table 1 shows the result.

Example 11

Colored pellets were obtained in the same manner as in Example 10 except that the phthalocyanine blue was replaced with indanthrene blue (Pigment Blue 60). Then, the colored pellets were fed to an injection molding machine to obtain a test plate, and the test plate was tested for resistance to chlorine-containing water in the same manner as in Example 1 to see a state of occurrence of blisters. Table 1 shows the result.

Example 12

A master batch was obtained in the same manner as in Example 1 except that 50 parts of the resin obtained in Preparation Example 1 was replaced with 50 parts of the resin obtained in Preparation Example 3. The master batch was used for preparing a test plate in the same manner as in Example 1, and the test plate was tested for resistance to chlorine-containing water in the same manner as in Example 1 to see a state of occurrence of blisters. Table 1 shows the result.

Example 13

A master batch was obtained in the same manner as in Example 1 except that 50 parts of the resin obtained in Preparation Example 1 was replaced with 50 parts of the resin obtained in Preparation Example 4. The master batch was used for preparing a test plate in the same manner as in Example 1, and the test plate was tested for resistance to chlorine-containing water in the same manner as in Example 1 to see a state of occurrence of blisters. Table 1 shows the result.

Comparative Example 1

A master batch was obtained in the same manner as in Example 1 except that 50 parts of the resin obtained in Preparation Example 1 was replaced with 50 parts of a polyethylene having a low molecular weight. The master batch was used for preparing a test plate in the same manner as in Example 1, and the test plate was tested for resistance to chlorine-containing water in the same manner as in Example 1 to see a state of occurrence of blisters. Table 1 shows the result.

TABLE 1

| | Evaluation | | Evaluation | | Evaluation |
|---|---|---|---|---|---|
| Ex. 1 | 4 | Ex. 6 | 3 | Ex. 11 | 4 |
| Ex. 2 | 4 | Ex. 7 | 4 | Ex. 12 | 3 |
| Ex. 3 | 4 | Ex. 8 | 4 | Ex. 13 | 3 |
| Ex. 4 | 4 | Ex. 9 | 4 | CEx. 1 | 1 |
| Ex. 5 | 4 | Ex. 10 | 4 | | |

Ex. = Example, CEx. = Comparative Example

The above results show that the present invention provides a colorant (colored) resin composition having resistance to chlorine-containing water which can provide molded articles having excellent resistance to chlorine-containing water.

What is claimed is:

1. A water-supply pipe obtained by molding a resin composition having blister-resistance and peel-resistance to chlorine-containing drinking water, which resin composition contains a polyethylene resin, a pigment and a copolymer resin obtained from an α-olefin having 10 to 20 carbon atoms and maleic anhydride.

2. A water-supply pipe according to claim 1, wherein the resin composition contains 100 parts by weight of the polyethylene resin, 0.01 to 10 parts by weight of the pigment and 0.005 to 10 parts by weight of the copolymer resin.

3. A water-supply pipe according to claim 1, wherein the resin composition contains 100 parts by weight of the polyethylene resin, 0.1 to 100 parts by weight of the pigment and 0.05 to 100 parts by weight of the copolymer resin.

4. A water-supply pipe according to claim 1, wherein the pigment is a blue pigment.

5. A water-supply pipe according to claim 4, the blue pigment is a phthalocyanine blue pigment, an indanthrene blue pigment, or both said pigments.

6. A water-supply pipe according to claim 5, wherein the phthalocyanine blue pigment is a copper phthalocyanine blue pigment.

7. A water-supply pipe according to claim 1, wherein the water-supply pipe is for drinking water.

8. A method for producing a water-supply pipe, which comprises molding a resin composition having blister-resistance and peel-resistance to chlorine-containing drinking water into a water-supply pipe, which resin composition contains a polyethylene resin, a pigment and a copolymer resin obtained from an α-olefin having 10 to 20 carbon atoms and maleic anhydride.

9. A method of increasing blister-resistance and peel-resistance of a water-supply pipe to chlorine-containing drinking water, which comprises producing the water-supply pipe from a resin composition containing a polyethylene resin, a pigment and a copolymer resin obtained from an α-olefin having 10 to 20 carbon atoms and maleic anhydride.

* * * * *

UNITED STATES PATENT AND TRADEMARK OFFICE
CERTIFICATE OF CORRECTION

PATENT NO. : 5,891,539
DATED : April 6, 1999
INVENTOR(S) : Izumi NAKANE et al.

It is certified that error appears in the above-identified patent and that said Letters Patent is hereby corrected as shown below:

Claim 5, line 1, after "4," insert --wherein--.

Signed and Sealed this

Fifteenth Day of August, 2000

Attest:

Q. TODD DICKINSON

*Attesting Officer*          *Director of Patents and Trademarks*